E. V. SHEPARD & F. J. MAYWALD.
FLAVORING COMPOSITION.
APPLICATION FILED AUG. 1, 1910.
988,213.
Patented Mar. 28, 1911.
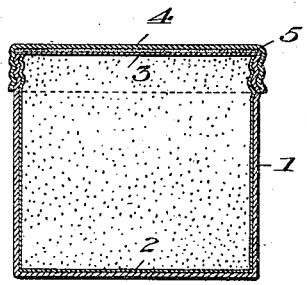

UNITED STATES PATENT OFFICE.

EDWARD V. SHEPARD AND FREDERICK J. MAYWALD, OF NEW YORK, N. Y.; SAID MAYWALD ASSIGNOR TO SAID SHEPARD.

FLAVORING COMPOSITION.

988,213.     Specification of Letters Patent.     Patented Mar. 28, 1911.

Application filed August 1, 1910. Serial No. 574,782.

*To all whom it may concern:*

Be it known that we, EDWARD V. SHEPARD and FREDERICK J. MAYWALD, citizens of the United States, residing at New York, in the county of New York and State of New York, have invented certain new and useful Improvements in Flavoring Compositions; and we do hereby declare the following to be a full, clear, and exact description of the invention, such as will enable others skilled in the art to which it appertains to make and use the same.

This invention relates to a new composition of matter for flavoring food and other products, and process of making the same; and it has for its object the dispensing of flavoring extracts, oils, or other compositions in a solid, soluble form containing a hygroscopic, non-volatile ingredient capable of preventing caking, insuring a more uniform mixture retarding volatilization and substantially preventing evaporation, oxidation or other chemical changes, of the otherwise ordinarily volatile flavoring constituents.

The invention comprises a soluble vehicle, preferably a sugar in the granulated state, associated or combined with the particular flavoring extract or oil desired, such as oil of lemon, orange, or almond, extract of vanilla, tonka, or synthetics, such as vanillin, or other substances imparting the peculiar and particular flavor desired, and associated with such flavoring compound or composition is a non-volatile, hygroscopic absorbent and volatile retardant of a soluble character, such as glycerin.

As an illustration of a composition having the character of our new flavoring product, and the manner in which the same is produced, we will take, for example, the production of almond flavoring from granulated sugar, oil of bitter almond, and glycerin, in about the following proportions, viz:—

| | |
|---|---|
| Granulated sugar | 100 lbs. |
| Oil of bitter almonds, (free from prussic acid) | 4 lbs. |
| Pure glycerin | 3 lbs. |

These ingredients are thoroughly mixed, producing a slightly moist, oily product, substantially each grain of which contains oil of almond protected by a coating of glycerin. The intimate mixture of sugar and glycerin serves as an absorber and carrier of essential oils, and like substances, in a way different from either sugar or glycerin alone, as without the sugar to absorb them, mixtures of glycerin with essential oils, or like substances, are liable to separate, and without the glycerin, essential oils quickly dry out of the sugar, oxidize, or otherwise change.

In putting up our flavoring composition, we prefer to employ cases substantially like that shown in the accompanying drawing, in which:—the figure illustrated is a central, longitudinal sectional view of a suitable case 1, preferably of aluminum, having its bottom and side walls lined with an oil-proof paper 2, and provided with a protecting topcovering 3 of similar material, the contents of the case being protected by a screwthreaded cap or top 4, having a lining of cork 5. As thus packed, the contents are sealed from the air and light, and are germ proof.

Having thus fully described our invention what we claim is:—

1. A new flavoring composition comprising grains of sugar impregnated with a flavoring substance, the impregnated grains being coated with a hygroscopic, non-volatile substance.

2. A new flavoring composition, comprising grains of sugar impregnated with oil of almond, the impregnated grains being coated with glycerin.

In testimony whereof we affix our signatures, in the presence of two witnesses.

EDWARD V. SHEPARD.
    FREDERICK J. MAYWALD.

Witnesses:
    JOHN KLEIN,
    CARL KLEIN.